United States Patent
Chen et al.

(10) Patent No.: US 10,755,422 B2
(45) Date of Patent: Aug. 25, 2020

(54) TRACKING SYSTEM AND METHOD THEREOF

(71) Applicant: HTC Corporation, Taoyuan (TW)

(72) Inventors: Yuan-Tung Chen, Taoyuan (TW); Tzu-Chieh Yu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 128 days.

(21) Appl. No.: 16/043,169

(22) Filed: Jul. 24, 2018

(65) Prior Publication Data

US 2019/0026904 A1 Jan. 24, 2019

Related U.S. Application Data

(60) Provisional application No. 62/535,976, filed on Jul. 24, 2017.

(51) Int. Cl.
*G06T 7/00* (2017.01)
*G06T 7/238* (2017.01)
*G06T 7/73* (2017.01)

(52) U.S. Cl.
CPC ............ *G06T 7/238* (2017.01); *G06T 7/73* (2017.01); *G06T 7/74* (2017.01); *G06T 2207/10016* (2013.01); *G06T 2207/20016* (2013.01); *G06T 2207/20044* (2013.01); *G06T 2207/20081* (2013.01); *G06T 2207/30204* (2013.01)

(58) Field of Classification Search
CPC .. G06T 7/238; G06T 7/74; G06T 7/73; G06T 2207/10016; G06T 2207/20016; G06T 2207/20044; G06T 2207/20081; G06T 2007/30204
See application file for complete search history.

(56) References Cited

U.S. PATENT DOCUMENTS

| | | | |
|---|---|---|---|
| 9,621,779 B2* | 4/2017 | Aoki | G06K 9/00268 |
| 2007/0031001 A1* | 2/2007 | Hamanaka | G06T 15/20 382/103 |

(Continued)

FOREIGN PATENT DOCUMENTS

CN 101548547 A 9/2009

OTHER PUBLICATIONS

Alejandro Rodriguez-Ramos et al. (Toward Fully Autonomous Landing on Moving Platform for Rotary Unmanned Arial Vehicle, IEEE, Jun. 13, 2017) (Year: 2017).*

(Continued)

*Primary Examiner* — Khai M Nguyen
(74) *Attorney, Agent, or Firm* — CKC & Partners Co., LLC

(57) ABSTRACT

The present disclosure provides a tracking system and method thereof. The tracking system comprises a trackable device with an appearance including a feature pattern and a tracking device. The tracking device comprises an optical sensor module configured to capture a first image which covers the trackable device. The tracking device further comprises a processor coupled to the optical sensor module. The processor is configured to retrieve a region of interest (ROI) of the first image based on the feature pattern, and locate a position of each of a plurality of feature blocks in the ROI, where each feature block contains a portion of the feature pattern. The processor further calculates a pose data of the trackable object according to the positions of the feature blocks.

20 Claims, 7 Drawing Sheets

(56) References Cited

U.S. PATENT DOCUMENTS

| | | | | |
|---|---|---|---|---|
| 2008/0080789 A1* | 4/2008 | Marks | ................... | A63F 13/10 |
| | | | | 382/296 |
| 2013/0028517 A1* | 1/2013 | Yoo | ................... | G06K 9/00375 |
| | | | | 382/173 |
| 2014/0022433 A1* | 1/2014 | Glennie | ............... | H04N 5/3454 |
| | | | | 348/333.02 |
| 2014/0307946 A1* | 10/2014 | Nakahira | .............. | G06T 7/0004 |
| | | | | 382/149 |
| 2016/0007026 A1* | 1/2016 | Dong | ................... | H04N 19/176 |
| | | | | 375/240.08 |

OTHER PUBLICATIONS

Alejandro Rodriguez-Ramos et al., "Towards Fully Autonomous Landing on Moving Platforms for Rotary Unmanned Aerial Vehicles", 2017 International Conference on Unmanned Aircraft Systems (ICUAS), IEEE, Jun. 13, 2017, pp. 170-178.

Carsten Fries et al., "Combining model- and template-based vehicle tracking for autonomous convoy driving", 2013 IEEE Intelligent Vehicles Symposium (IV), IEEE, Jun. 23, 2013, pp. 1022-1027.

Corresponding European official communication dated Feb. 22, 2019.

Corresponding Taiwan office action dated Aug. 5, 2019.

\* cited by examiner

TRACKING SYSTEM AND METHOD THEREOF

CROSS-REFERENCE TO RELATED APPLICATION

This application claims priority to U.S. Provisional Application Ser. No. 62/535,976, filed on Jul. 24, 2017, which is herein incorporated by reference.

BACKGROUND

Field of Invention

The present disclosure relates to a tracking system and method. More particularly, the present disclosure relates to a tracking system and method by analyzing images to track an object.

Description of Related Art

In the conventional method for tracking objects by image recognition, it usually needs to take many consecutive images and identify features in these continuous images to lock the object for tracking. For example, if the object to be tracked has the feature of specific lighting frequency, it is needed to retrieve continuous images, perform image recognition in these images, and estimate the movement of the object through the results of image recognition.

However, the conventional method of tracking objects by analyzing many images needs to perform image recognition in each image respectively. The larger the resolution of the image is, the more it costs to search the object in the image, which results in the burden of tracking objects. How to reduce the burden or the cost of tracking objects is an important issue.

SUMMARY

According to an embodiment of the present disclosure, a tracking system is disclosed. The tracking system comprises a trackable device and a tracking device. The trackable device comprises at least one feature pattern on an appearance of the trackable device. The tracking device comprises an optical sensing module and a processor. The optical sensing module is configured to capture a first image of the trackable device. The processor, coupled to the optical sensing module, is configured to acquire in the first image a first region of interest corresponding to the feature pattern based on the feature pattern; locate in the first region of interest a plurality of block positions of multiple feature blocks, wherein each feature block comprises part of the feature pattern; and calculate a first pose data of the trackable device according to the plurality of block positions.

According to an embodiment of the present disclosure, a tracking method is disclosed. The tracking method is suitable for tracking a trackable device having at least one feature pattern on its appearance. The method comprises the steps of: capturing a first image including the trackable device; acquiring, based on the feature pattern, in the first image a first region of interest corresponding to the feature pattern; locating in the first region of interest a plurality of block positions of multiple feature blocks, wherein each feature block comprises part of the feature pattern; and calculating a first pose data of the trackable device according to the plurality of block positions.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
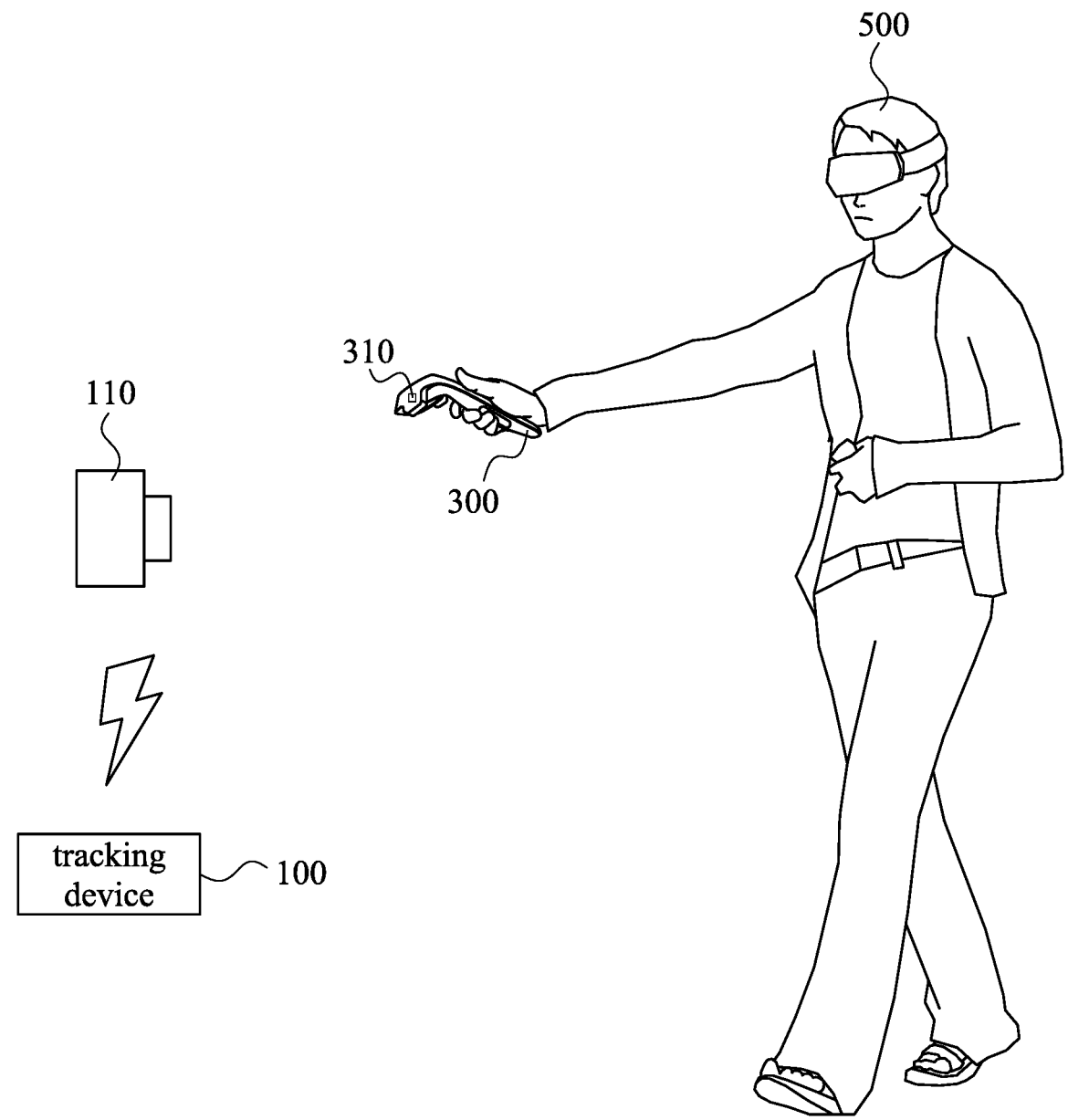
FIG. 1 is a schematic diagram showing a tracking system in the environment according to an embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram showing a tracking system in the environment according to an embodiment of this disclosure. As shown in FIG. 1, there are a tracking device 100 and a trackable device 300 in an environment. The tracking device 100 is sited in the environment, and a user 500 holds the trackable device 300 in hand and moves freely in the three dimensional environment. When the trackable device 300 is moved, an optical sensing module 110 of the tracking device 100 captures images in the environment. In FIG. 1, the tracking device 100 and the optical sensing module 110 are separated elements. In another embodiment, the optical sensing module 110 may be disposed on the tracking device 100. A feature pattern 310 used for recognition is disposed on the trackable device 300. The feature pattern 310 is generated with special design to prevent from causing confusion with other objects in the space, so as to upgrade degree of recognition. The optical sensing module 110 transmits the images to the tracking device 100 after capturing the images such that the tracking device 100 can perform image recognition. When the tracking device 100 determines that the image has the feature pattern 310, the tracking device 100 can determine that the trackable device 300 is present in the image and then track the trackable device 300. In some embodiments, the tracking device 100 can be a virtual reality (VR), augmented reality (AR) or mixed reality (MR) head-mounted device or head-mounted display device worn by the user 500. The trackable device 300 can be any controlling device worn on the body of the user 500, such as a handheld-controller or gloves. In some embodiments, the trackable device 300 can be replaced by any object that has the feature pattern on its appearance, and the portion of the feature pattern is a rigid body such that the feature pattern will not be distorted to cause a recognition failure.

In some embodiments, one or more optical sensing modules 110 can be disposed on the tracking device 100. The optical sensing modules 110 may be cameras. For example, the tracking device 100 has four cameras disposed adjacently with each other to capture images in different view of points. By increasing the number of cameras, the possibility for detecting the trackable device 300 in the environment increases so that the time needed for searching the trackable device 300 can be shortened.

Figure 2:
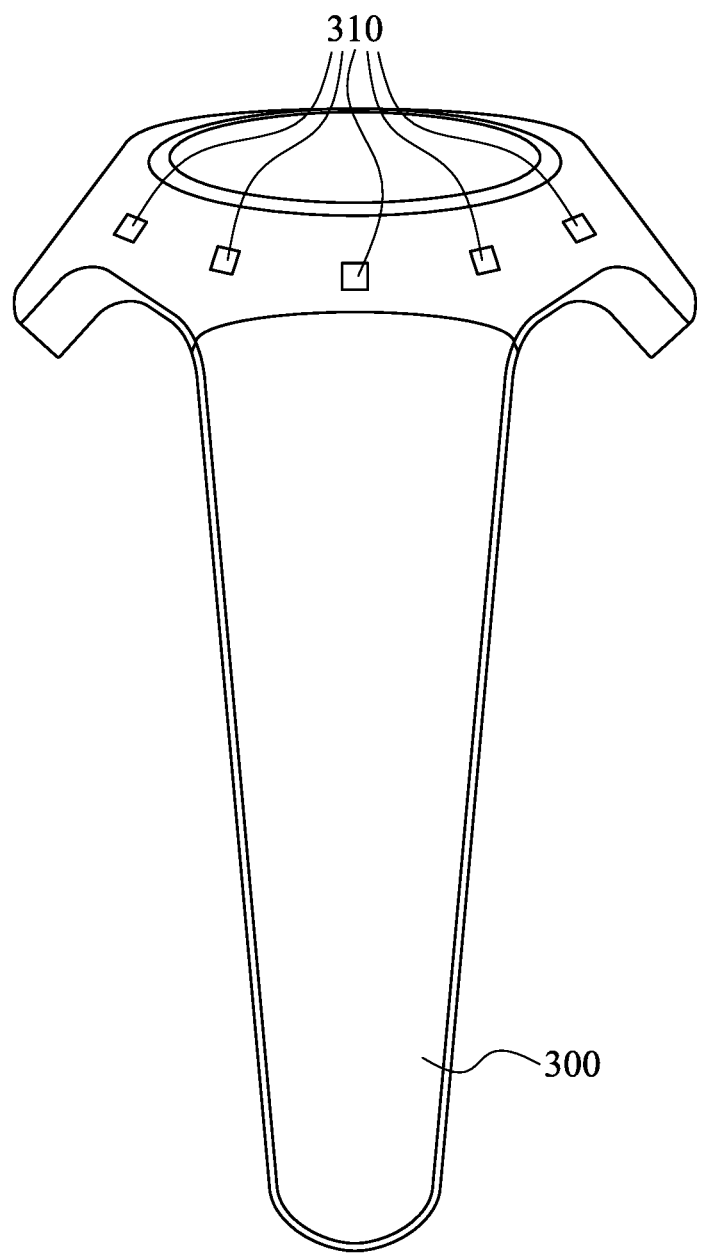
FIG. 2 is a functional block diagram illustrating a trackable device according to an embodiment of the disclosure.

Reference is made to FIG. 2, which is a functional block diagram illustrating the trackable device 300 according to an embodiment of the disclosure. One or more feature patterns 310 are disposed on the trackable device 300. The number of the feature patterns 310 will influence the effect of searching the trackable device 300 in the images. The more the feature patterns 310 are disposed on the trackable device 300, the easier it is to capture the feature pattern 310 in the images and thus to confirm the existence of the trackable device 300 in the space. In some embodiments, the feature patterns are different with each other or disposed on the trackable device 300 with differences (e.g. different sizes or orientations), so as to increase the degree of recognition for each of the feature patterns.

In some embodiments, the feature patterns 310 are spread on the trackable device 300 to form a large pattern. In this way, the successful rate of recognizing the trackable device 300 can also increase.

Figure 3:
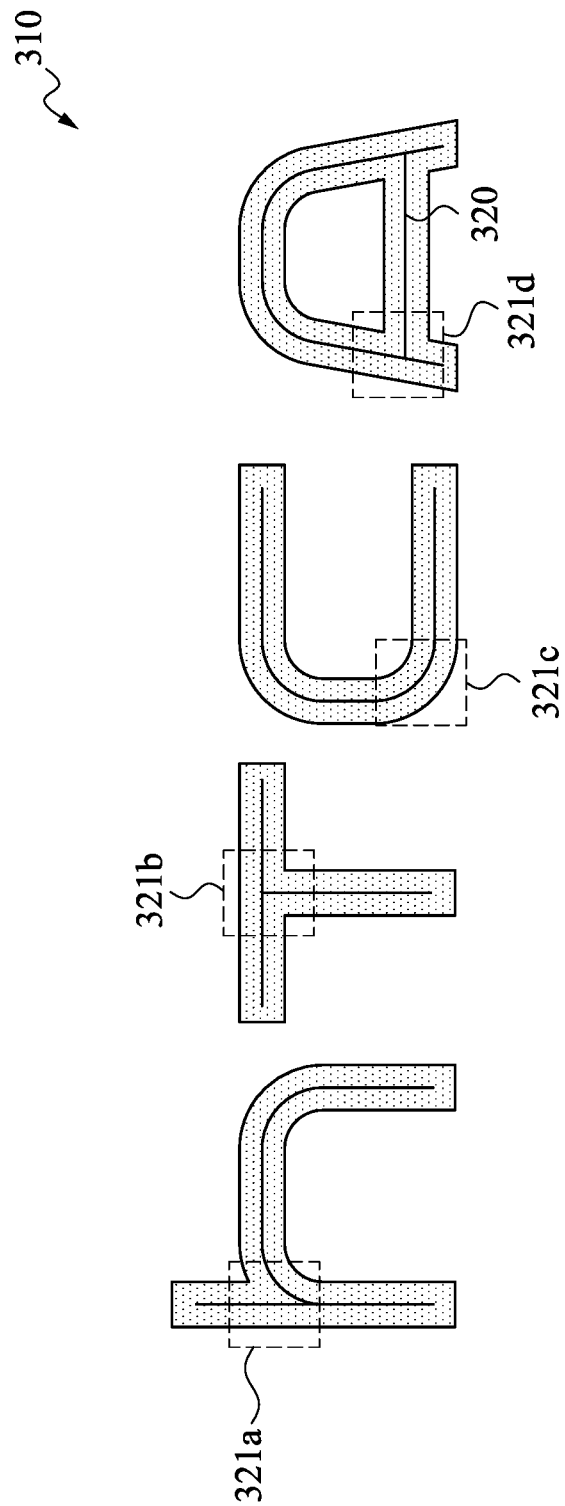
FIG. 3 is a schematic diagram illustrating the feature pattern used for tracking according to an embodiment of this disclosure.

Reference is made to FIG. 3, which is a schematic diagram illustrating the feature pattern used for tracking according to an embodiment of this disclosure. As shown in FIG. 3, the feature pattern 310 comprises the pattern "hTCA", and the lines within each letter represent a skeleton 320 of the feature pattern 310. Also, a plurality of smaller feature blocks 321a-321d are shown in FIG. 3, and each of the feature blocks 321a-321d comprises a part of the feature pattern 310. These feature blocks 321a-321d are blocks different from each other or unique blocks in the entire feature pattern 310.

It should be mentioned that the feature pattern 310 may be a geometric pattern or a pattern different from an object, a decoration and so on in the normal environment, and the present disclosure does not limit the layout and design of the feature pattern 310. In some embodiments, the feature pattern 310 must have more than one (e.g. four) feature blocks different with each other. Details for the feature blocks will be described below.

Figure 4:
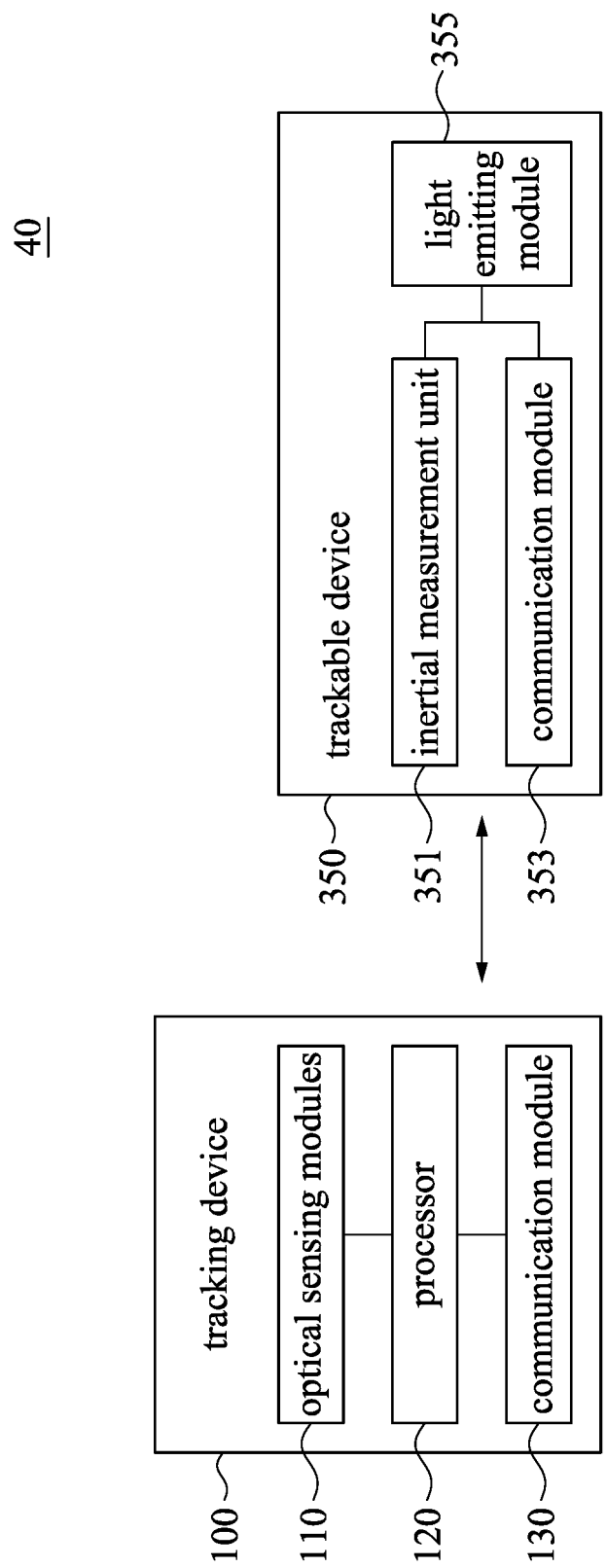
FIG. 4 is a functional block diagram illustrating the tracking system according to an embodiment of the disclosure.
Figure 5:
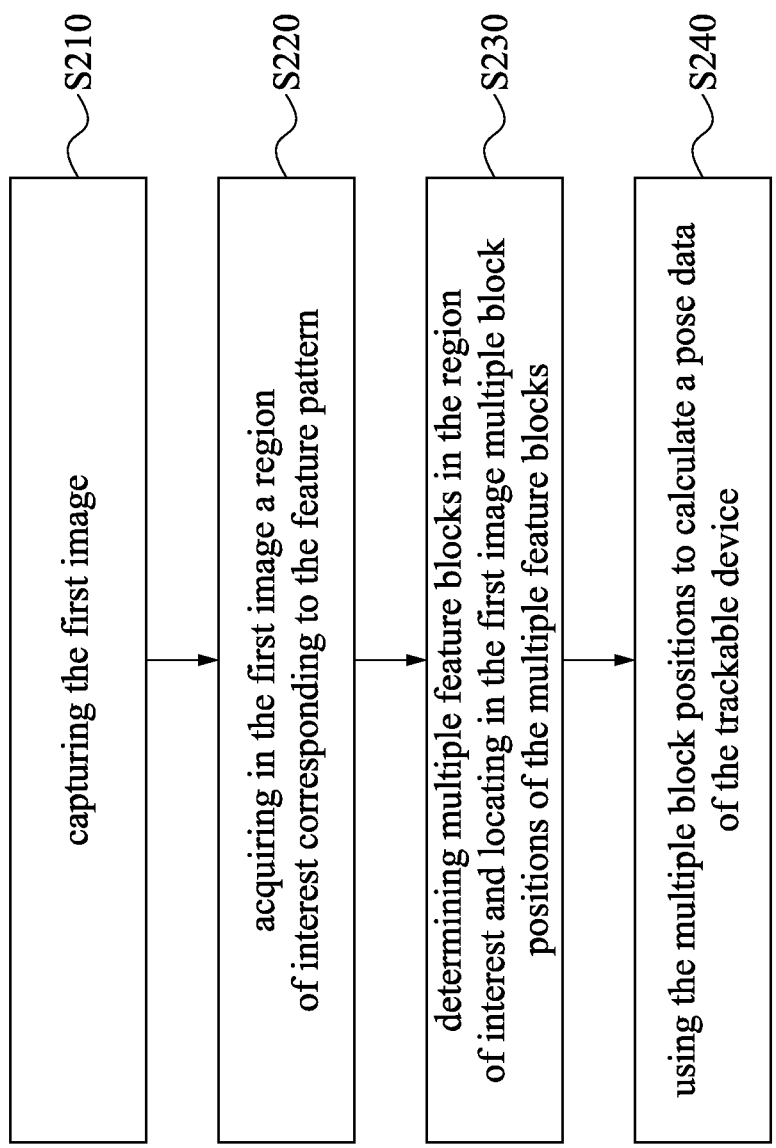
FIG. 5 is a flow diagram illustrating the tracking method according to an embodiment of the disclosure.

Reference is made to FIG. 4, which is a functional block diagram illustrating the tracking system 40 according to an embodiment of the disclosure. As shown in FIG. 4, the tracking system 40 comprises the tracking device 100 and a trackable device 350. The tracking device 100 comprises the optical sensing module 110, a processor 120 and a communication module 130. The tracking device 100 and the trackable device 350 execute the operations as illustrated in the environment in FIG. 1, that is, the user 500 holds the trackable device 350 in hand and moves freely in the three dimensional environment. Reference is also made to FIG. 5, which is a flow diagram illustrating the tracking method 200 according to an embodiment of the disclosure. In step S210, the optical sensing module 110 captures the first image. Then, in step S220, the processor 120 acquires a region of interest (ROI) corresponding to the feature pattern (such as the feature pattern 310 shown in FIG. 3) in the first image based on the feature pattern. For example, the processor 120 can search features in the first image based on the entire feature pattern to determine whether the first image comprises the feature pattern or not; if the first image comprises the feature pattern, the region of interest containing the feature pattern 310 will be extracted from the first image. In some embodiments, the skeleton 320 of the feature pattern 310 shown in FIG. 3 is used to search the first image. Because the number of pixels of the skeleton 320 is less than that of the feature pattern 310, it takes less time to perform the image search and the image comparison so that the region of interest in the first image can be found more quickly.

In some embodiments, a first deep learning algorithm is used in the tracking method 200 to determine the region of interest of the first image. For example, in the case that the tracking device 100 (as shown in FIG. 1) has a plurality of cameras, a plurality of first images can be captured at the same time. In the step S220 of the tracking method 200, there may be 0 or more than one region of interest acquired in each of the first image. For example, four cameras capture four first images at the same time, and there are 2, 2, 1 and 0 regions of interest acquired in the four first images respectively. The processor 120 will take the five regions of interest as the inputs in the first deep learning algorithm, and output the region of interest that is the most accurate or has the highest confidence value. The first deep learning algorithm is obtained by training beforehand. In the training procedure, a large amount of images with labels (i.e., indicating whether the image comprises the feature pattern) are used as the inputs to train the parameters for the deep learning model, and the deep learning algorithm suitable for determining whether the images have the feature pattern is constructed accordingly.

Then, in the step S230, the processor 120 determines in the region of interest the plurality of feature blocks (e.g. the feature blocks 321a-321d shown in FIG. 3) and locates in the first image a plurality of block positions of the plurality of feature blocks. The plurality of block positions can be the image coordinates of the feature blocks in the first image. To locate the plurality of block positions as described in step S230 is to search the plurality of feature blocks in the region of interest first. These feature blocks are, for example, the foresaid image blocks with different features. Because the size of the region of interest (e.g. 100×120) is much smaller than that of the first image (e.g. 1024×768), the positions of the feature blocks in the first image can be fast calculated by searching the even smaller feature blocks (e.g. 20×20) in the region of interest.

Then, in the step S240, the processor 120 uses the plurality of block positions to calculate a pose data of the trackable device 300. For example, the processor 120 obtains four image coordinates of the four feature blocks. Because the tracking system 40 has internal parameters of the optical sensing module 110 (such as its 3-dimensional coordinates) and the image coordinates of the four feature blocks, a pose estimation algorithm such as a perspective n-point algorithm can be used to estimate the pose information of the trackable device 300 in the space. The pose information comprises, for example, at least one of a three-axis position (e.g. the three-axis coordinates relative to the optical sensing module 110), a yaw value, a pitch value, a roll value, and three-axis rotation angles.

Figure 6:
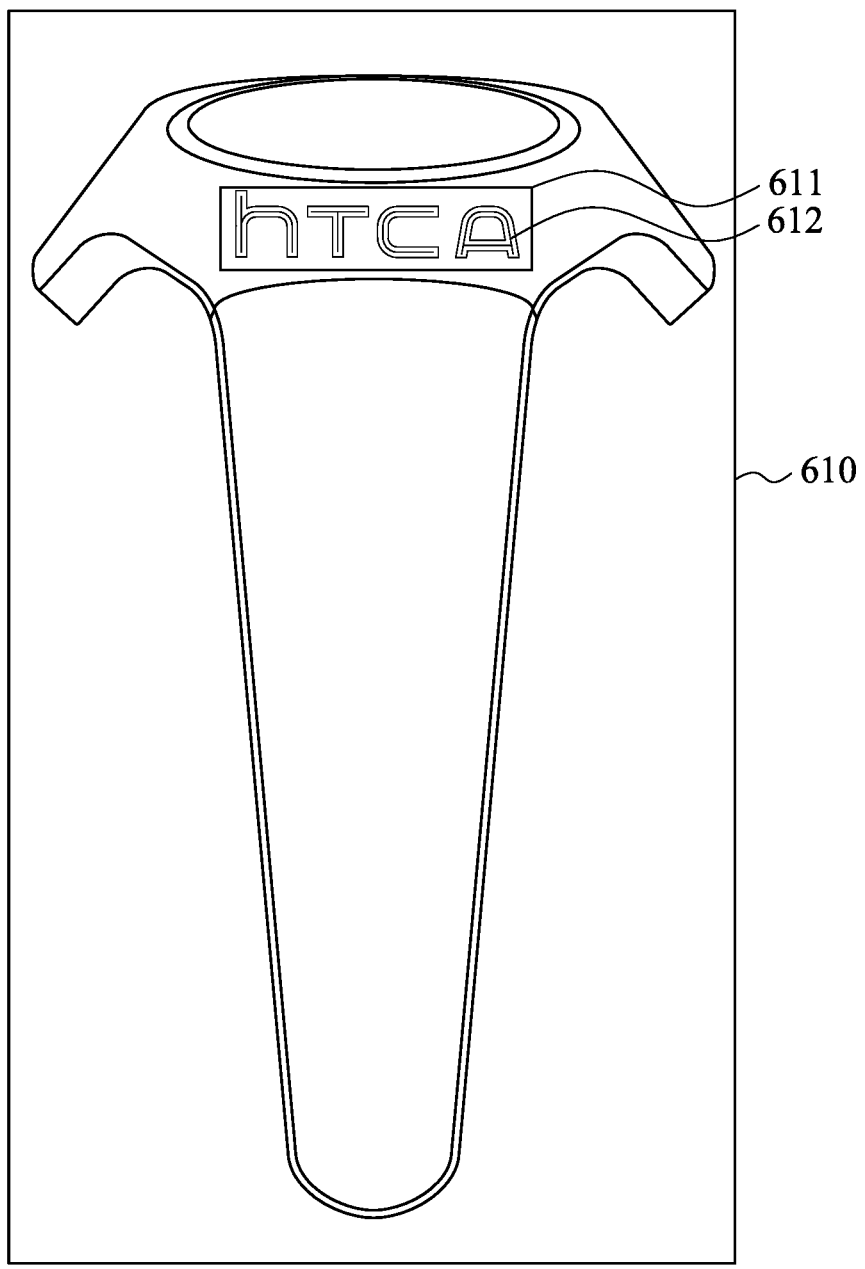
FIG. 6 is a schematic diagram showing an image captured by the tracking device.

Reference is made to FIG. 6, which is a schematic diagram showing the first image 610 captured by the optical sensing module 110 of the tracking device 100. The figure takes one feature pattern disposed on the trackable device 300 as example. After executing the step S220 in FIG. 5, the processor 120 acquires, based on the feature pattern 612, the region of interest 611 corresponding to the feature pattern 612 in the first image 610. After obtaining the region of interest 611, the following tracking procedure for the trackable device 300 will be focused thereon. The present disclosure will illustrate how to track the region of interest 611 in different images without need of making full image recognition for each image.

Please refer to FIG. 4 again, the trackable device 350 comprises an inertial measurement unit (IMU) 351, a communication module 353 and a light emitting module 355. The inertial measurement unit 351 is coupled to the communication module 353 and configured to sense the movement of the trackable device 350 in the three dimensional space to generate a motion signal accordingly. The motion signal is transmitted by the communication module 353, and received by the communication module 130 of the tracking device 100. The inertial measurement unit 351 can continuously provide 3-axis acceleration and angular velocity which, after applying specific mathematic operations, can represent the translation and rotation of the trackable device 350 during a period of time. Thus, the translation and rotation between two time points are related to the acceleration and angular velocity.

Figure 7:
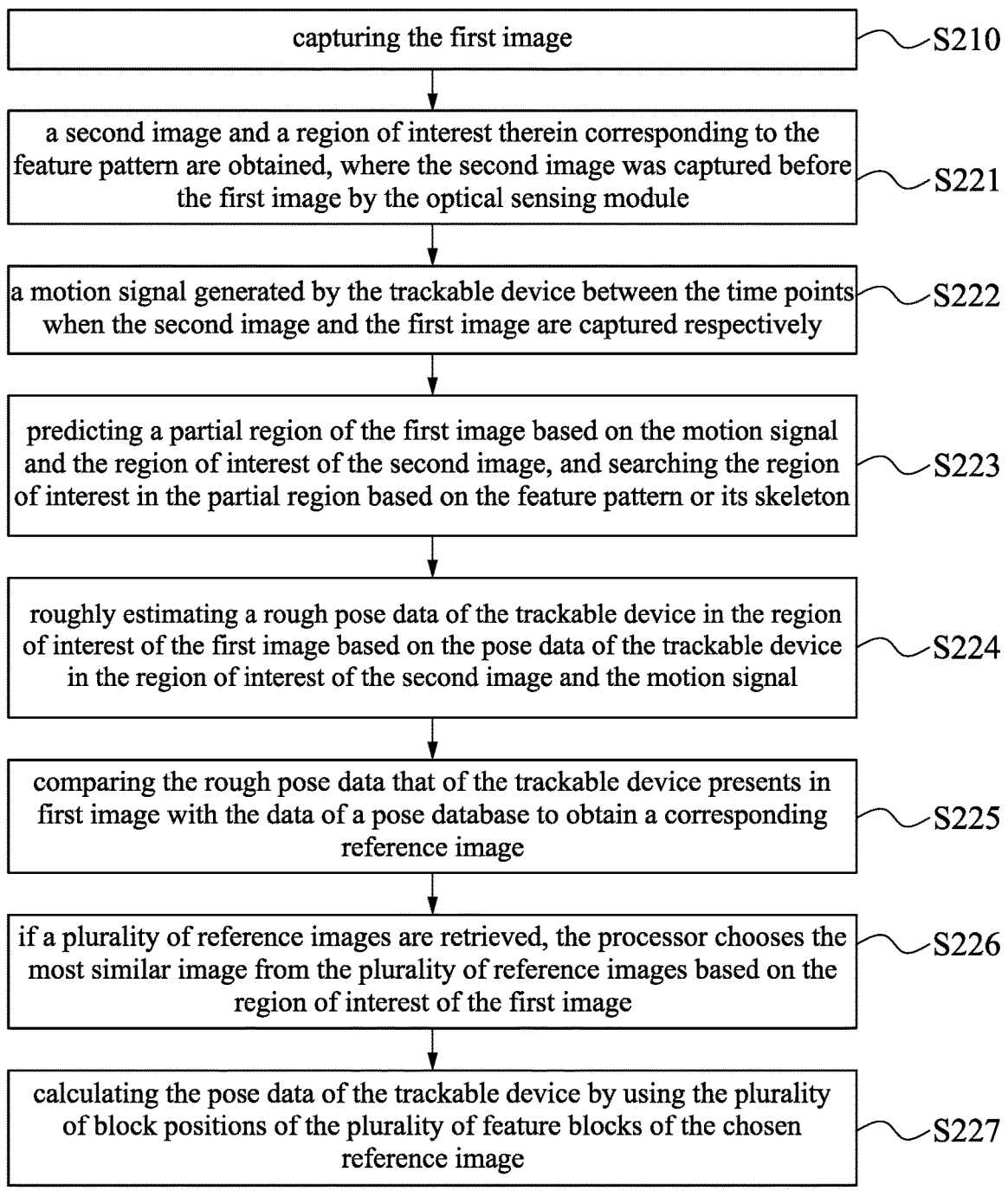
FIG. 7 is a flow diagram illustrating the tracking method according to an embodiment of the disclosure.

FIG. 7 is a flow diagram illustrating the tracking method 700 according to an embodiment of the disclosure. Please also refer to FIG. 4, where the user holds and waves the trackable device 350 in the space. In the step S210, the optical sensing module 110 shoots toward the space and captures the first image. The step is the same as the step S210 in FIG. 5.

Then, in the step S221, a second image and a region of interest therein corresponding to the feature pattern are obtained, where the second image was captured before the first image by the optical sensing module 110. The second image is a frame captured at a former time point. Take 30 Hz frame rate as example, then the second image is captured 1/30 second earlier than the first image. The region of interest of the second image is the region corresponding to the feature pattern acquired when doing tracking at the former time point. In other words, the first and second images are continuous images comprising the region of interest or the feature pattern.

In the step S222, a motion signal generated by the trackable device 350 between the time points when the second image and the first image are captured respectively. The motion signal may be an acceleration signal and an angular velocity signal generated by the inertial measurement unit 351. Then, in the step S223, the processor 120 predicts a partial region of the first image based on the motion signal and the region of interest of the second image, and searches the region of interest in the partial region based on the feature pattern or its skeleton. For example, the region of interest of the second image is a small block having the size of 100×120 and the coordinates of its center point is (576, 488) in the second image. The processor 120 performs a double integral and a single integral on the acceleration signal and the angular velocity signal respectively by using the time period between the second image and the first image, so as to obtain the translation and rotation of the motion of the trackable device 350. Then, a mapping transformation is performed on the translation and rotation to estimate that, after the motion, the region of interest of the second image will map to which position in the first image. Then, the partial region will be set based on the estimated position in order to search the region of interest of the first image. Thus, there is no need to search in the entire first image, and the speed and accuracy of the searching operation are greatly improved. It should be noted that if there is no former effective positioning data such that the second image and its region of interest at the former time point cannot be obtained, e.g. the situation of performing the first time positioning after powering on the device or lost tracking, it is necessary to search the region of interest in the entire first image.

Then, in the step S224, the processor 120 roughly estimates a rough pose data of the trackable device 350 in the region of interest of the first image based on the pose data of the trackable device 350 in the region of interest of the second image and the motion signal. Here the term of rough pose data is used since more accurate pose data will be calculated subsequently based on the rough pose data, as described below. The pose data of the trackable device 350 in the region of interest of the second image is generated by the positioning operation at the former time point, and, according to the foresaid description, the motion (comprising the translation and rotation) of the trackable device 350 during the time period from the second image to the first image can be calculated from the motion signal, so the processor 120 can roughly estimate the rough pose data of the trackable device 350 in the region of interest of the first image base on the motion and the former pose data (i.e. the pose data of the trackable device 350 in the region of interest of the second image). In some embodiments, when the pose data of the trackable device 350 in the region of interest of the second image cannot be obtained, such as the foresaid situation of the first time positioning operation after powering up the device or lost tracking, the tracking method 700 will perform a second deep learning algorithm to generate the rough pose data of the trackable device 350. Similar to the foresaid first deep learning algorithm, the second deep learning algorithm is also obtained by training beforehand. During the training procedure, a large amount of images comprising feature patterns with different pose data are used as the inputs to train the parameters for the deep learning model and construct the deep learning algorithm that is suitable for determining the pose of the feature pattern in the image. Therefore, if the region of interest of the first image which has the feature pattern is the input of the algorithm, the second deep learning algorithm can output the corresponding pose with the highest confidence value.

After executing the step S224, the processor 120 obtains the rough pose data of the trackable device 350 in the first image. Then in the step S225, the processor 120 compares the rough pose data of the trackable device 350 in first image with the data of a pose database to obtain a corresponding reference image. In some embodiments, the pose database stores a plurality of reference images generated in advance, and each reference image comprises the feature pattern and has a corresponding pose data and multiple block positions of the feature blocks. For example, the processor 120 searches the same or the most similar one or more values in the pose database by using at least one of the translation and the rotation, and retrieve the reference images corresponding to the found values. Thus, one or more reference images will be obtained.

Then, in the step S226, if a plurality of reference images are retrieved, the processor 120 chooses the most similar image from the plurality of reference images based on the region of interest of the first image (which comprises the feature pattern). In some embodiments, the processor 120 can perform an image similarity algorithm to compare the region of interest with the plurality of reference images detailedly, so as to find the most similar reference image. In some embodiments, if only one reference image is retrieved from the pose database, the processor 120 also performs the detailed comparison between the region of interest and the reference image to confirm whether the retrieved reference image is correct or not.

It should be mentioned that all reference images in the pose database according to the present disclosure have block positions of a plurality of feature blocks. That is, the reference images in the pose database have not only the feature pattern but also accurate block positions of the plurality of feature blocks. For example, if the reference image has four feature blocks, it will also record the accurate positions of the four feature blocks in the reference image. Then, after choosing the reference image, in the step S227, the processor 120 can calculate the pose data of the trackable device 350 by using the plurality of block positions of the plurality of feature blocks of the chosen reference image. Relative to the foresaid rough pose data, the pose data calculated here is more accurate. In some embodiments, the processor 120 calculates the pose data of the trackable device 350 by using the plurality of block positions (e.g. the image coordinates) to perform a pose estimation algorithm, such as perspective n-point algorithm. Hence, the tracking method 700 can get many feature points and their image positions in the images fast for calculating the accurate pose data of the trackable device 350.

It should be mentioned that the tracking method 200 and the tracking method 700 in the present disclosure can calculate the pose data of the trackable device 350 (or the trackable device 300) with each retrieved image (or multiple images retrieved at the same time), without need of retrieving two or more images (or retrieving images twice or more times) to determine the pose data. Hence, the present disclosure is not limited by the low frame rate of the general optical sensing module, and the efficiency of tracking by image recognition is thus improved.

Please refer to FIG. 4 again, the trackable device 350 comprises a light emitting module 355, configured to cause the first image captured by the optical sensing module 110 having a light pattern corresponding to the feature pattern. For example, the feature pattern on the appearance of the trackable device 350 can be made transparent and the light emitting module 355 can be disposed inside the trackable device 350, so that the portion of the feature pattern is transparent to form the light pattern corresponding to the feature pattern. In some embodiments, in the foresaid tracking method 200 and the tracking method 700, when the processor 120 is to obtain the region of interest corresponding to the feature pattern, the processor 120 will threshold the first image first to obtain a thresholded image. Hence, the processor 120 can retrieve the region of interest having the light pattern in the thresholded image. In this manner, the speed of determining the region of interest (e.g. the step S210 in FIG. 5) can be faster by the thresholding operation.

In summary, the embodiments of the present disclosure provides the methods for rapidly recognizing trackable objects. The method preliminarily determines whether the object is detected in the image or not based on the feature pattern or its skeleton at first. Then, the method predicts the region of interest of next image and the rough pose data by combining the region of interest and the pose data, generated by performing positioning in the previous image, and the motion signal of the object. The method then uses the pose database to obtain the most accurate block positions of the feature blocks without need of respectively calculating the position of each image feature point, thereby performing the pose estimation operations rapidly to obtain accurate object poses.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A tracking system, comprising:
a trackable device comprising at least one feature pattern on an appearance of the trackable device;
a tracking device, comprising:
an optical sensing circuit, configured to capture a first image comprising the trackable device; and
a processor coupled to the optical sensing circuit, the processor being configured to:
acquire, based on the feature pattern, in the first image a first region of interest corresponding to the feature pattern;
locate in the first region of interest a plurality of block positions of a plurality of feature blocks, wherein each of the plurality of feature blocks comprises part of the feature pattern and the part of the feature pattern of each of the plurality of feature block is different from each other; and
calculate a first pose data of the trackable device according to the plurality of block positions.
2. The tracking system of claim 1, wherein the processor acquires in the first image the first region of interest based on a skeleton of the feature pattern.
3. The tracking system of claim 1, wherein the processor is further configured to process a deep learning algorithm based on the first region of interest in order to generate a rough pose data of the trackable device in the first region of interest.
4. The tracking system of claim 1, wherein when the processor acquires the first region of interest, the processor is further configured to:
obtain a second image captured before the first image by the optical sensing circuit and a second region of interest corresponding to the feature pattern in the second image;
obtain a motion signal generated by the trackable device between time points when the second image and the first image are captured respectively;
predict in the first image a partial region based on the motion signal and the second region of interest; and
search in the partial region of the first image the first region of interest based on the feature pattern.
5. The tracking system of claim 4, wherein the processor calculates a rough pose data of the trackable device in the first region of interest based on a second pose data of the trackable device in the second region of interest and the motion signal.
6. The tracking system of claim 5, wherein the tracking device further comprises:
a pose database configured to store a plurality of pose data of the trackable device and a plurality of reference images corresponding to the plurality of pose data, wherein the processor is further configured to:
find in the pose database a corresponding reference image based on the rough pose data of the trackable device, wherein the corresponding reference image comprises the plurality of feature blocks; and
locate the plurality of block positions of the plurality of feature blocks based on the corresponding reference image.

7. The tracking system of claim 4, wherein the trackable device further comprises:
an inertial measurement unit configured to generate the motion signal of the trackable device; and
a communication circuit to the inertial measurement unit, configured to transmit the motion signal to the tracking device.

8. The tracking system of claim 1, wherein the trackable device comprises a light emitting circuit configured to cause the first image captured by the optical sensing circuit having a light pattern corresponding to the feature pattern, wherein when the processor acquires the first region of interest, the processor is further configured to:
threshold the first image to obtain a thresholded image; and
acquire in the thresholded image the first region of interest, wherein the first region of interest comprises the light pattern.

9. The tracking system of claim 1, wherein the first pose data comprises at least one of a three-axis position, a yaw value, a pitch value, and a roll value.

10. The tracking system of claim 1, wherein when the processor calculates the first pose data of the trackable device, the processor executes a pose estimation algorithm to calculate the first pose data based on an image coordinate of each of the plurality of block positions of the plurality of feature blocks in the first image.

11. A tracking method, suitable for a trackable device comprising at least a feature pattern on an appearance of the trackable device, the method comprising:
capturing a first image comprising the trackable device;
acquiring, based on the feature pattern, in the first image a first region of interest corresponding to the feature pattern;
locating in the first region of interest a plurality of block positions of a plurality of feature blocks, wherein each of the plurality of feature blocks comprises part of the feature pattern and the part of the feature pattern of each of the plurality of feature block is different from each other; and
calculating a first pose data of the trackable device according to the plurality of block positions.

12. The tracking method of claim 11, wherein the step of acquiring the first region of interest comprises: acquiring in the first image the first region of interest based on a skeleton of the feature pattern.

13. The tracking method of claim 11, further comprising:
processing a deep learning algorithm based on the first region of interest, in order to generate a rough pose data of the trackable device in the first region of interest.

14. The tracking method of claim 11, wherein the step of acquiring the first region of interest comprises:
obtaining a second image captured before the first image and a second region of interest corresponding to the feature pattern in the second image;
obtaining a motion signal generated by the trackable device between time points when the second image and the first image are captured respectively;
predicting in the first image a partial region based on the motion signal and the second region of interest; and
searching in the partial region of the first image the first region of interest based on the feature pattern.

15. The tracking method of claim 14, further comprising:
calculating a rough pose data of the trackable device in the first region of interest based on a second pose data of the trackable device in the second region of interest and the motion signal.

16. The tracking method of claim 15, further comprising:
generating a pose database configured to store a plurality of pose data of the trackable device and a plurality of reference images corresponding to the plurality of pose data;
wherein the step of locating the plurality of block positions comprises:
finding in the pose database a corresponding reference image based on the rough pose data of the trackable device, wherein the corresponding reference image comprises the plurality of feature blocks; and
locating the plurality of block positions of the plurality of feature blocks based on the corresponding reference image.

17. The tracking method of claim 14, wherein the motion signal is generated by an inertial measurement unit of the trackable device.

18. The tracking method of claim 11, wherein the trackable device comprises a light emitting circuit that the first image comprises a light pattern corresponding to the feature pattern, wherein the step of acquiring the first region of interest further comprises:
thresholding the first image to obtain a thresholded image; and
acquiring in the thresholded image the first region of interest, wherein the first region of interest comprises the light pattern.

19. The tracking method of claim 11, wherein the first pose data comprises at least one of a three-axis position, a yaw value, a pitch value, and a roll value.

20. The tracking method of claim 11, wherein the step of calculating the first pose data of the trackable device comprises:
executing a pose estimation algorithm to calculate the first pose data based on an image coordinate of each of the plurality of block positions of the plurality of feature blocks in the first image.

* * * * *